(12) United States Patent
Muratov et al.

(10) Patent No.: US 6,850,045 B2
(45) Date of Patent: Feb. 1, 2005

(54) MULTI-PHASE AND MULTI-MODULE POWER SYSTEM WITH A CURRENT SHARE BUS

(75) Inventors: Vladimir Alexander Muratov, Manchester, NH (US); Stefan Wlodzimierz Wiktor, Raleigh, NC (US)

(73) Assignee: Texas Instruments Incorporated, Dallas, TX (US)

( * ) Notice: Subject to any disclaimer, the term of this patent is extended or adjusted under 35 U.S.C. 154(b) by 86 days.

(21) Appl. No.: 10/425,309

(22) Filed: Apr. 29, 2003

(65) Prior Publication Data

US 2004/0217741 A1 Nov. 4, 2004

(51) Int. Cl.[7] .................................................. G05F 1/40
(52) U.S. Cl. ........................ 323/272; 323/240; 323/285
(58) Field of Search ............................... 323/225, 237, 323/240, 246, 271, 272, 282, 284, 285; 363/97, 65; 307/43

(56) References Cited

U.S. PATENT DOCUMENTS 5,684,686 A * 11/1997 Reddy .......................... 363/97

2003/0006650 A1 * 1/2003 Tang et al. .................... 307/43
2003/0201761 A1 * 10/2003 Harris ......................... 323/272

* cited by examiner

Primary Examiner—Jessica Han
(74) Attorney, Agent, or Firm—W. Daniel Swayze, Jr.; W. James Brady; Frederick J. Telecky, Jr.

(57) ABSTRACT

A pulse width modulator (305) for driving a load in a multi-phased power system having circuitry (270) responsive to channel signals for providing an average signal by summing the channel signals at a node (221) which is coupled with a plurality of resistive elements, and having further circuitry for providing an error between said load and said reference potential, and having still further circuitry (250) for summing the channel signals, average signal, and error for providing a respective drive signal for each of the power switches, wherein the error signal and the average signal have complementary effects on a duty factor of the drive signals and the channel signal has an effect contrary to the error signal and the average signal. Further, a plurality of pulse width modulators (305) can be combined as a system (300) by connecting respective nodes (221) for providing current sharing between all phases.

29 Claims, 3 Drawing Sheets

MULTI-PHASE AND MULTI-MODULE POWER SYSTEM WITH A CURRENT SHARE BUS

FIELD OF THE INVENTION

The invention relates generally to integrated circuits and, more particularly, to a current-mode controlled multiphase power system.

BACKGROUND OF THE INVENTION

There is a strong trend in the field of low voltage DC/DC converters for computers and communication systems towards higher load currents. Increased load current requirements most often are addressed by the interleaved synchronous multi-phase converters. It is very important for reliability of synchronous multi-phase converters that all phases share the load equally. Inequality in phase currents results in increased current draw from the corresponding input rail above the current normally associated with load demand. The increased current substantially increasing power dissipation in active and passive components effectively reducing overall system efficiency and reliability. Also, it is often of major importance to some computer and communication systems to have the ability to scale the system capabilities by using several similar or identical converters in parallel which further extends design requirements for load current sharing to an inter-module level.

DC/DC converters that employ conventional current-mode control inherently provide some degree of spreading the load current between the phases and from module to module. However, conventional current-mode systems operating over a wide range of input voltage have limited current feedback to avoid a sub-harmonic oscillation which tends to limit achievable current equity. Also, conventional solutions do not provide a means to actively share the current between several modules.

In contrast, DC/DC converters that employ conventional voltage-mode control require special circuitry for processing phase current related signals to derive corrective signals that in turn alter the duty factor of each phase. In conventional voltage-mode systems, a high performance error amplifier with high bandwidth is typically required to boost the phase at frequencies higher than the converter's control loop crossover frequency which presents design challenges typically having extensive cost associated therewith. These design challenges are exacerbated in multi-module systems. Additionally, the voltage mode converters inherently have deprived response to the input voltage step which limits their applicability.

Therefore, there is a need for a multi-phase power system employing an innovative control scheme for distributing the load current between system channels without compromising small signal response and input voltage step response. Furthermore, for power systems comprised of several multi-phase power modules, it would be advantageous to provide load sharing not only between the phases within a single module but between the modules as well.

SUMMARY

The present invention achieves technical advantages as an apparatus and system for current sharing in a multi-phased power system in which each phase has a power switch for selectively coupling a corresponding inductor to a source and a load, the multi-phased power system further including a sensor coupled with the inductors for sensing a channel current in each phase and providing a plurality of signals each representative of a corresponding channel current. Circuitry is included which is coupled with the sensor for receiving the channel signals for providing an average signal by summing the channel signals at a node which is coupled with a plurality of resistive elements corresponding to the number of phases of the multi-phased power system in which the average signal is detectable in one of the resistive elements and each resistive element has substantially the same resistivity. Further circuitry is coupled with the load and a reference potential for providing a signal representative of an error between the load and the reference potential, and still further circuitry is coupled with the sensor, the first circuitry, and the second circuitry for receiving the channel signals, the average signal, and the error signal for providing a respective drive signal for each of the power switches in which the error signal and the average signal have complementary effects on a duty factor of the drive signals and the channel signal has an effect contrary to the error signal and the average signal.

BRIEF DESCRIPTION OF THE DRAWINGS

For a more complete understanding of the present invention, reference is made to the following detailed description taken in conjunction with the accompanying drawings wherein.

DETAILED DESCRIPTION

Figure 1:
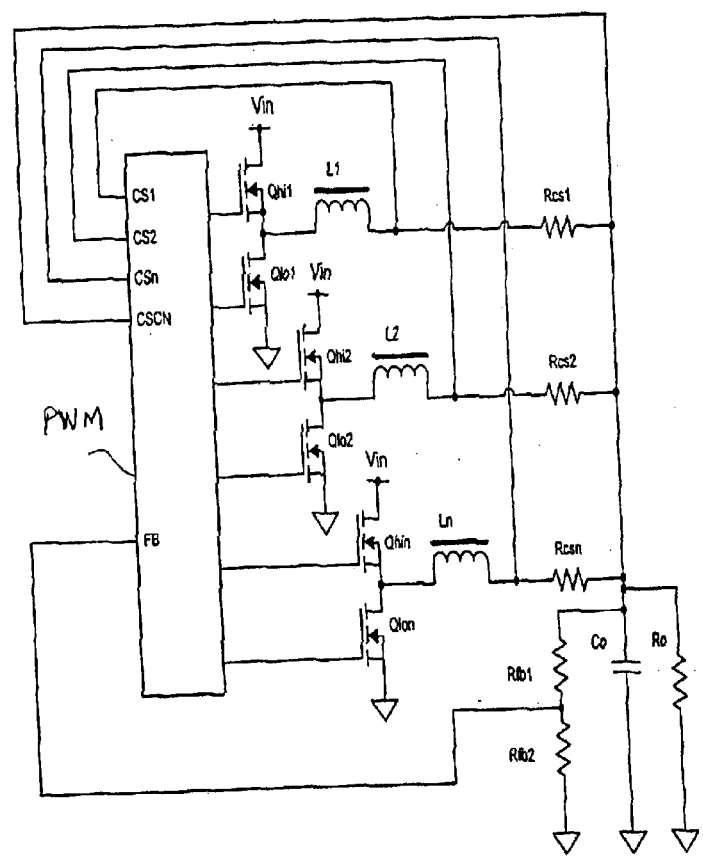
FIG. 1 illustrates a multi-phase power system.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Conventional multi-phase power systems include a pulse width modulation (PWM) controller, power MOSFETs, and an LC output filter. The MOSFETs direct current in the output inductors ($L_1, L_2, \ldots L_n$) in which a high-side switch selectively couples the inductor to a positive power supply ($V_{in}$) while a low-side switch selectively couples the inductor to a ground reference. The PWM controller directs activation and deactivation timing of the high-side and low-side switches, via signaling.

Referring to FIG. 1 there is shown a multi-phase power system which includes a pulse width modulation (PWM) controller, power MOSFETs, LC output filter, and output feedback loops in accordance with exemplary embodiments of the present invention. Power conversion is performed by a plurality of power channels working in parallel. The MOSFETs (indicated as Q) control current in the output inductors (L) in which a high-side switch selectively couples the inductor to a positive power supply while a low-side switch selectively couples the inductor to ground. The PWM controller controls the high-side and low-side switches via signaling to the control terminals of the MOSFETs.

Figure 2:
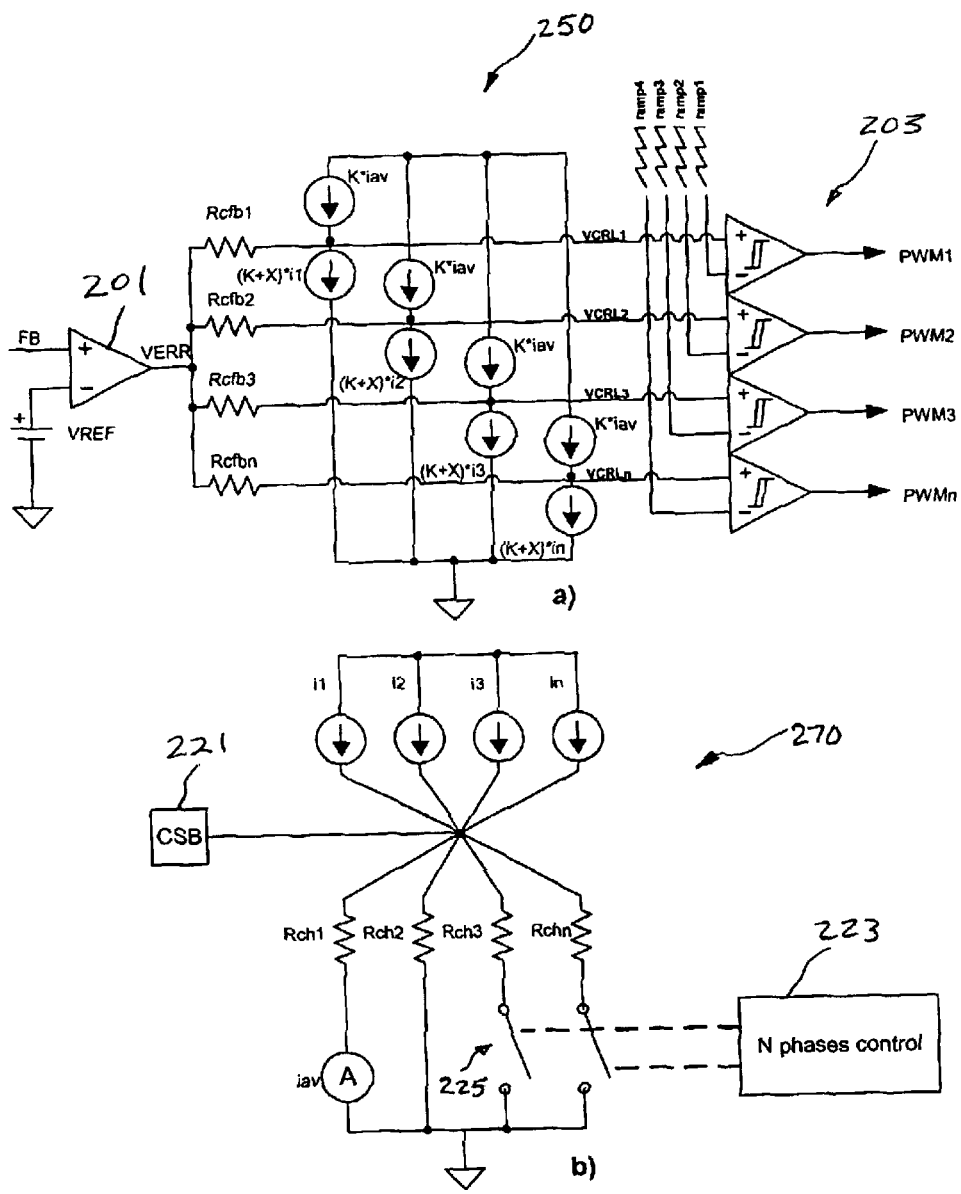
FIGS. 2A and 2B illustrate multi-phase power systems in accordance with exemplary embodiments of the present invention.

An important function of the PWM controller is to assure equal sharing between the plurality of channels. Current sharing functions include sensing channel current, via sensor circuitry such as the illustrated resistors, comparing channel currents to the average system current and adjusting control signaling in accordance with the results. Current representative signals of the channel currents ($C_{S1}$, $C_{SS2}$, $C_{Sn}$, ... $C_{SCn}$) are derived from the voltage drops across corresponding channel resistors ($R_{CS1}$, $R_{CS2}$, ... $R_{CSn}$). These current representative signals are further processed in PWM control circuitry as shown in FIGS. 2A and 2B and below-described.

Referring now to FIG. 2A there is shown a control circuit 250 for generation of Pulse Width Modulated (PWM) signals to operate a multi-phase power system in accordance with exemplary embodiments of the present invention. The control circuit 250 generates PWM signals by means of comparators 203 that compare channel control signals VCRL1, VCRL2, ..., VCRLn to channel ramp voltages ramp1, ramp2, ..., rampn. In turn, the channel control signals are generated from the voltage error signal VERR from the error amplifier 201 and current feedback signals generated from signals $C_{S1}$, $C_{S2}$, $C_{Sn}$. VERR is representative of an error between system output voltage (FB) and the reference voltage VREF, where from FIG. 1 it can be seen that the output voltage is VREF*(Rfb1+Rfb2)/Rfb2. In each channel, the current feedback signals used for generation of PWM switching signals are comprised of two components from which one (K+X)*i is representative of a phase current and a second K*iav is representative of an average current iav=(i1+i2+ ... +in)/n, where K and X are positive non-zero values and n is the number of channels in a power system. An algebraic sum of VERR and both of the above-mentioned current components effectively control the PWM switching signal of each channel. In a preferred embodiment, the error signal VERR and the second current feedback component K*iav are enabled to have actions which complement each other while, in contrary, the (K+X)*i feedback component action contradicts the action of VERR and K*iav.

Generally, as voltage on the output of the error amplifier 201 increases (i.e., VERR increases), the duty factor of the PWM signals (PWM1, PWM2, PWM3, ... PWMn) increases. An increase of the K*iav current component also increases control voltage on the input of the PWM comparators 203 and the duty factor due to the voltage drop across resistors Rcfb. In contrary, an increase of the (K+X)*i current component reduces control voltage on inputs of the comparators 203 and reduces the duty factor of PWM signals (PWM1, PWM2, PWM3, ... PWMn).

Current feedback components (K+X)*i and K*iav are scaled between each other and the error signal VERR such that in a frequency domain the double-pole response of the output LC-filter (i.e., the inductors and capacitor shown in FIG. 1) is substantially suppressed. According to exemplary embodiments of the present invention, this is enabled by having the (K+X)*i current component dominating over the K*iav current component using the X coefficient. For example, tentatively, the phase current "i" is equal to the average current "iav". With X>1 the (K+X)*i component will always be larger than K*iav. Under such conditions the whole system behaves like a system with the current mode control and the double-pole response suppressed. If X=or<0, the system exhibits typical pure voltage mode behavior. In a practical circuit, gains of circuitry that generate current components K*iav and (K+X)*i are specifically manufactured using known techniques to achieve the above-described effect.

Referring now to FIG. 2B there is shown a circuit 270 for generating the average current iav in accordance with exemplary embodiments of the present invention. Additionally, to enhance flexibility of the power system, in accordance with exemplary embodiments of the present invention, a current shared bus (CSB) 221 is provided. The CSB 221 sums, on a single node, all the currents that are representative of the channel currents (i1, i2, i3, ... in). The CSB node is terminated by a plurality of the resistors or other means with specific impedance that combined are representative of the number of phases or channels in the power system. For example, in a 4-phase system the CSB 221 is terminated by 4 resistors (Rchi, $R_{ch2}$, $R_{ch3}$, $R_{ch4}$) of the same value. In this case, the current "i" through each resistor is equal to the average current "iav". In another embodiment, a plurality of the resistors ($R_{ch1}$, $R_{ch2}$, $R_{ch3}$, $R_{ch4}$) can be combined into a single resistive element.

Controller 223 can also be included and provides for correction in the case when the numberofpopulated channelschanges. If, for example, the numberofchannels has changed as a result of not populating one channel, controller 223 opens one of two switches 225. Two switches are shown, however, one or more than two are also contemplated. The information of the number of channels, populated and non-populated, are provided to the controller 223 from the PWM via an information coupling. As a result, the CSB node is terminated by only three resistors. The current "i" through each resistor is then still representative of the average current "iav".

The sum of the currents into the CSB node is divided by these resistors inversely proportional to their resistivity or impedance. In a preferred embodiment, all the resistors are of the same value such that the current in one of the resistors effectively represents the average channel current "iav". This current is further used to derive the K*iav component of the current feedback in each channel for the control circuit of FIG. 2A. The summing CSB node is made accessible to all channels of a multi-phase controller and in another embodiment to all modules of a multi-module system as below-described.

Figure 3:
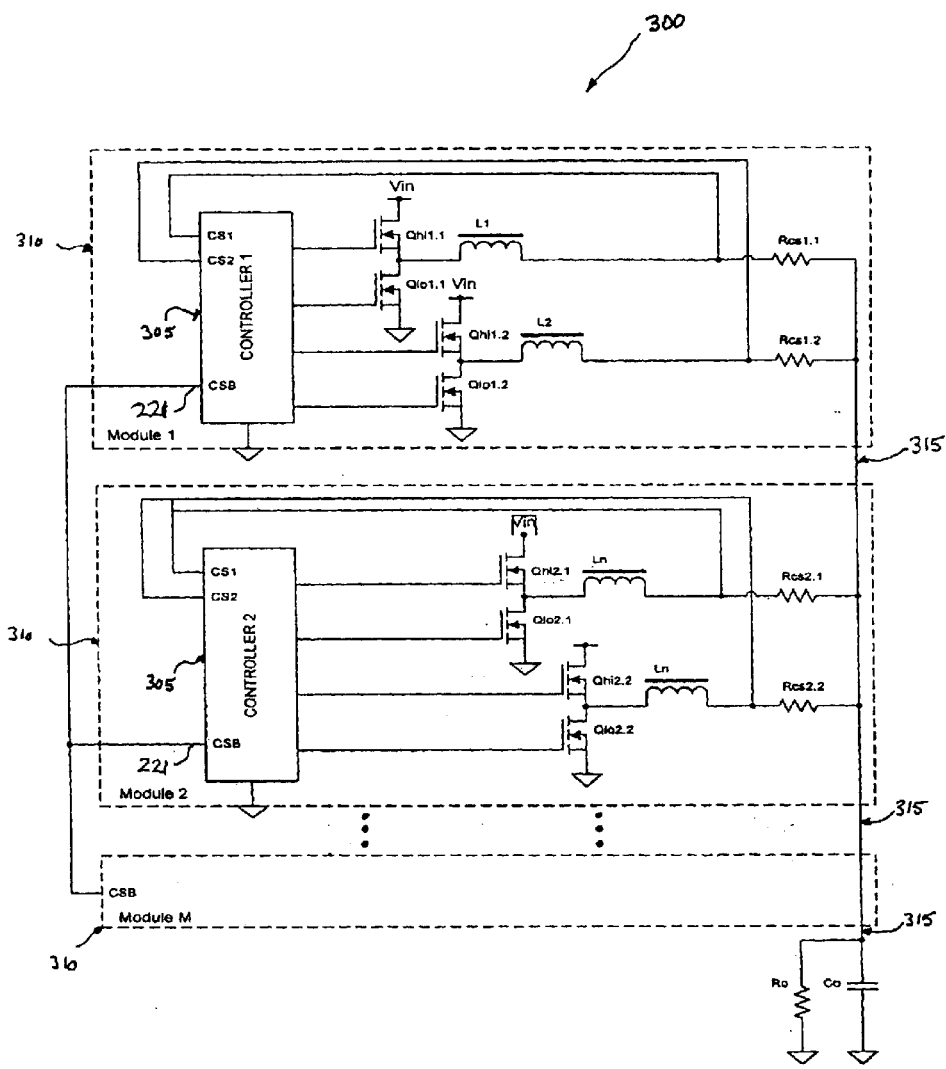
FIG. 3 illustrates a multi-phase power multi-module power system in accordance with exemplary embodiments of the present invention.

Referring now to FIG. 3 there is shown a multi-module system 300 in accordance with exemplary embodiments of the present invention. Each controller 305 implements circuitry of FIGS. 2A and 2B. Each module 310 is an independent power system that can have a number ofchannels. Several of such units can be connected in parallel by connecting the module output terminals 315. In a practical system, VERR nodes of different modules should also be connected together and error amplifiers 201 in all but one module disabled to prevent undesired interference between modules.

An even spread of the load current between modules is enabled by connecting CSB nodes 221 of all modules. For example, in a configuration in which all modules have the same number of channels, each phase in each module bares the same current which is Io/(N+M), where Io is load current associated with system load Ro; N is number of channels in each module, and M is number of modules in a system.

Even current sharing is enabled not only in the case of identical modules but also with modules having different numbers of channels. Indeed, if for example, a two-phase module is connected in parallel to a three-phase module and all modules have the same value of Rch (FIG. 2) and all the gains (K and X) are kept the same in each module, the phase current is Io/(2+3).

Another advantage of the present current share scheme unknown in conventional approaches is that current sharing proportional to current capabilities of each module also can be enabled. For example, a power system for providing an 80A load current, comprised of a three-phase module in which each channel can only bare 20 A and a two-phase module in which each channel can bare only 10 A, is enabled according-to embodiments of the present invention by providing Rch resistors terminating the current share bus in the two-phase system having twice the value of Rch resistors provided in the three-phase module. As the CSB node voltage is common for both modules, equilibrium is achieved when the "iav" current in the three-phase module is twice that of the "iav" current in the two-phase module. This in turn commands channel currents in the three-phase module to be twice that of the channel currents in the two-phase module, thus, the modules are loaded in proportion to their load capabilities. Although exemplary ebodiments of the invention are described above in detail, this does not limit the scope of the invention, which can be practiced in a variety of embodiments.

What is claimed is:

1. A pulse width modulator for driving a load in a multi-phased power system, each phase having a power switch for selectively coupling a corresponding inductor to a source and said load, said multi-phased power system further including a sensor for sensing a channel current in each said phase and providing a plurality of signals each representative of a corresponding channel current, said pulse width modulator comprising:

first circuitry coupled with said sensor for receiving said channel signals and responsive thereto for providing an average signal by summing said channel signals at a node coupled with a plurality of resistive elements corresponding to the number of phases of said multi-phased power system, wherein said average signal is detectable in one of said resistive elements, each said resistive elements having substantially the same resistivity;

second circuitry coupled with said load and a reference potential and responsive thereto for providing a signal representative of an error between said load and said reference potential; and third circuitry coupled with said sensor, said first circuitry, and said second circuitry for receiving said channel signals, said average signal, and said error signal, and responsive thereto for providing a respective drive signal for each of said power switches, wherein said error signal and said average signal have complementary effects on a duty factor of said drive signals and said channel signal has an effect contrary to said error signal and said average signal.

2. The system of claim 1, wherein an increase in one of said error signal and said average signal lends to increase the duty factor of said drive signals while an increase in said channel signal tends to decrease the duty factor.

3. The system of claim 1, wherein said first circuitry includes a phase coupled with at least one of said resistive elements for removing said one resistive element from said node responsive to an indication of a channel having substantial zero load current associated therewith.

4. The system of claim 1, wherein a plurality of said plurality of resistive elements are combined into one component.

5. A multi-phased power system for driving a load, comprising:

a pulse width modulation system having a plurality of phases, each phase including a power switch for selectively coupling a corresponding inductor between a source and said load, said pulse width modulation system further comprising:

a sensor coupled with each phase for sensing a respective channel current and providing a plurality of signals each representative of a corresponding channel current; and first circuitry coupled with said sensor for receiving said channel current signals and responsive thereto for providing an average signal by summing said channel current signals at a node coupled with a plurality of resistive elements corresponding to the number of phases of said second pulse width modulation system, wherein said average signal is detectable in one of said resistive elements, each resistive element having substantially the same resistivity;

second circuitry coupled with said load and a reference potential and responsive thereto forproviding an error signal representative of adifference between said load and said reference potential; and third circuitry coupled with said sensor, said first circuitry, and said second circuitry for receiving said channel current signals, said average signal, and said error signal, and responsive thereto for providing a drive signal for each of said power switches, wherein said error signal and said average signal have complementary effects on a duty factor of said drive signals and said channel current signal has an effect contrary to said error signal and said average signal.

6. The system of claim 5 further including a further pulse width modulation system, wherein said respective nodes are electrically coupled.

7. A multi-phase power system comprised from a plurality of power converter channels each of which is receptive to the input voltage and the control signals and produces an output voltage and the output current by generating a switching signal depending upon said input voltage and said control signals, allowing the said channel output voltages and the output currents to be coupled together to create a common output rail that is in turn connected to the load, said system comprising:

a control circuit that produces signals for operating the said power system and each power converter channel and is receptive to at least the reference voltage, the output voltage, and the plurality of channel currents flowing though the system, comprising:

means to generate an error signal representative to the difference between the system output voltage and the reference voltage;

means to generate a plurality of the first current signals represent to the power system channel-currents;

means to generate a plurality of the second current signals effectively representative to an average of all channel-currents in the system;

means to combine said error signal, said first current signal, and said second current signal into a single control signal individually for each channel from said plurality of power system channels in a way that the error signal action and the second current feedback component action complement each other while the first current feedback component action opposes the action of the error signal and the second current component on a channel duty factor;

means to adjust the contribution of said error signal, said first current signal and said second current signal into said control signal;

means to generate the switching signal based on the said control signal individually for each power system channel.

8. A multi-phase power system as of claim 7 wherein the contribution of said error signal, said first current signal and said second current signal into said control signal allows the double-pole response of the output LC-filter to be substantially suppressed.

9. A multi-phase power system as of claim 8 wherein the first current component is dominating over the second current component such that $$\{V_{contr} = V_{eer} - (K+X)*i_1 + K*(i_1+i_2+i_3 \ldots +i_N)/N, \text{ where } K>0; X>0\}.$$

10. A multi-phase power system as of claim 7 wherein means to generate a plurality of the second current signals effectively representative to an average of all channel-currents in a system is further comprises:
   a current share bus that sums into a single node all the first current signals;
   a plurality of resistors, one for each channel, that terminates the current share bus; means to generate a plurality of second current signals from a current branched into at least one of the said resistors.

11. A multi-phase power system as of claim 10 having a current share bus connected to current-share terminal electrically accessible to other members of the multi-module multi-phase power system.

12. A multi-phase power system as of claim 10 wherein individual phases have equal load capability and all resistors connected to the current share bus are of the same value.

13. A multi-phase power system as of claim 10 wherein individual phases have different load capability and values of the resistors connected to the current share is inversely proportional to the current capability of the individual channel.

14. A multi-module power system as of claim 7 further comprised of other multi-phase power systems having the current-share bus terminals all connected together.

15. A multi-module power system as of claim 14 wherein individual modules have equal load capacity and the same impedance of the current-share bus terminals.

16. A multi-module power system as of claim 14 wherein individual modules have different load capability and the impedance of the current-share bus terminals is inversely proportional to the current capability of the individual module.

17. A multi-module power system as of claim 14 wherein individual modules have different load capability having additional means to adjust individual module current share-bus terminal impedance to achieve proper loading of said modules.

18. A multi-phase power system comprised from a plurality of power converter channels each of which is receptive to the input voltage and the control signals and produces an output voltage and the output current by generating a switching signal depending upon said input voltage and said control signals, allowing the channel output voltages and the output currents to be coupled together to create a common output rail that is in turn connected to the load, the system comprising:
   a control circuit that produces signals required to operated the said power system and each power converter channel and is receptive to at least the reference voltage the output voltage, and the plurality of channel currents flowing through the system, comprising:
   means to generate a plurality of the first current signals representative to the power system channel-currents;
   means to generate a plurality of the second current signals effectively representative to a difference between a single channel-current and an average of all channel-currents in the system;
   means to combine said error signal, said first current signal, and said second current signal into a single control signal individually for each channel form said plurality of power system channels in a way that the first current feedback component action and the second current signal action complement each other and oppose the error signal action on a channel duty factor;
   means to adjust the contribution of said error signal, said first current signal and said second current signal into said control signal;
   means to generate the switching signal based on the said control signal individually for each power system channel.

19. A multi-phase power system as of claim 18 wherein the contribution of said error signal, said first current signal and said second current signal into said control signal allows the double-pole response of the output LC-filter to be substantially suppressed.

20. A multi-phase power system as of claim 19 wherein the first current component has a non zero contribution into resulting phase control signal;

$$\{V_{contr} = V_{err} - X\,i_1 - K\{[(N-1)/N]*i_1 + (i_2+i_3+ \ldots +i_N)/N\}, \text{ where } K>0; X>0\}.$$

21. A multi-phase power system as of claim 18 wherein means to generate a current signal effectively representative to an average of all channel-currents in a system is further comprises:
   a current share bus that sums into a single node all the first current signals;
   a plurality of the resistors, one for each channel, that terminates the current share bus;
   means to generate an error signal representative to the difference between the system output voltage and the reference voltage;
   means to generate a plurality of signals representative of an average of all channel-currents in the system from a current branched into at least one of the said resistors.

22. A multi-phase power system as of claim 21, wherein a plurality of said plurality of resistive elements are combined into one component.

23. A multi-phase power system as of claim 21 having a current share bus connected to current-share terminal electrically accessible to other members of the multi-module multi-phase power system.

24. A multi-phase power system as of claim 21 wherein individual phases have equal load capacity and all resistors connected to the current share bus are of the same value.

25. A multi-phase power system as of claim 21 wherein individual phases have different load capability and values of the resistors connected to the current share is inversely proportional to the current capability of the individual channel.

26. A multi-module power system as of claim 18 further comprised of other multi-phase power systems having the current-share bus terminals all connected together.

27. A multi-module power system as of claim 26 wherein individual modules have equal load capability and the same impedance of the current-share bus terminals.

28. A multi-module power system as of claim 26 wherein individual modules have different load capacity and the impedance of the current share-bus terminals is inversely proportional to the current capability of the individual module.

29. A multi-module power system as of claim 26 wherein individual modules have different load capacity having additional means to adjust the individual module current share-bus terminal impedance to achieve proper loading of said modules.

* * * * *